United States Patent
Chau

(10) Patent No.: US 12,137,184 B2
(45) Date of Patent: Nov. 5, 2024

(54) RECORDING A MESSAGE USING A SOFTWARE PLATFORM SERVICE

(71) Applicant: Zoom Video Communications, Inc., San Jose, CA (US)

(72) Inventor: Vi Dinh Chau, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/064,549

(22) Filed: Dec. 12, 2022

(65) Prior Publication Data

US 2023/0114797 A1 Apr. 13, 2023

Related U.S. Application Data

(63) Continuation of application No. 17/243,161, filed on Apr. 28, 2021, now Pat. No. 11,539,838.

(51) Int. Cl.
*H04M 3/493* (2006.01)
*H04N 5/76* (2006.01)

(52) U.S. Cl.
CPC .............. *H04M 3/493* (2013.01); *H04N 5/76* (2013.01)

(58) Field of Classification Search
CPC ................................ H04M 3/493; H04N 5/76
USPC ........................................................ 379/88.01
See application file for complete search history.

(56) References Cited

U.S. PATENT DOCUMENTS

| | | | |
|---|---|---|---|
| 5,760,823 A | 6/1998 | Brunson et al. | |
| 8,203,589 B2 * | 6/2012 | Jackson | H04N 7/14 379/88.13 |
| RE44,732 E | 1/2014 | Osann, Jr. | |
| 8,817,063 B1 * | 8/2014 | Lefar | H04M 3/53325 379/88.19 |
| 8,831,573 B2 | 9/2014 | Sigmund et al. | |
| 9,225,836 B2 * | 12/2015 | Lefar | H04M 3/53325 |
| 9,363,380 B2 | 6/2016 | Shaw et al. | |
| 9,686,412 B2 | 6/2017 | Grenier et al. | |

(Continued)

FOREIGN PATENT DOCUMENTS

| | | |
|---|---|---|
| AU | 2010358740 C1 | 4/2015 |
| WO | 2008020947 A1 | 2/2008 |

OTHER PUBLICATIONS

International Search Report and Written Opinion mailed on Jun. 27, 2022 in corresponding PCT Application No. PCT/US2022/024824.

*Primary Examiner* — Binh Kien Tieu
(74) *Attorney, Agent, or Firm* — Young Basile Hanlon & MacFarlane, P.C.

(57) ABSTRACT

A video voicemail recording system enables a caller to leave a conventional audio voicemail message over the telephony connection used for routing a call or to leave a message of a different communication modality using a client application at the calling device. A call is routed to a client device from a calling device. In-call options for selection at the calling device are presented responsive to the call going unanswered, in which a first in-call option allows an operator of the calling device to record an audio-only voicemail message over the telephony service and a second in-call option allows the operator of the calling device to record or input a message of a second communication modality (e.g., a video message). A request to open the client application at the calling device is transmitted responsive to a selection of the second in-call option. The message is received in response thereto.

17 Claims, 7 Drawing Sheets

(56) References Cited

U.S. PATENT DOCUMENTS

| | | |
|---|---|---|
| 2004/0202302 A1 | 10/2004 | Richards |
| 2005/0283813 A1 | 12/2005 | Jamail et al. |
| 2007/0180135 A1 | 8/2007 | Kenrick et al. |
| 2008/0062246 A1 | 3/2008 | Woodworth et al. |
| 2008/0304637 A1* | 12/2008 | Ganganna ............ H04M 3/436 |
| | | 379/88.23 |
| 2009/0066781 A1 | 3/2009 | Jackson et al. |
| 2014/0122053 A1 | 5/2014 | Lotan et al. |
| 2014/0169539 A1* | 6/2014 | Mumick ............... H04M 3/533 |
| | | 379/88.23 |
| 2015/0145946 A1* | 5/2015 | Xin ....................... H04N 7/155 |
| | | 348/14.06 |
| 2015/0222753 A1 | 8/2015 | Noldus |
| 2015/0281458 A1 | 10/2015 | Bianco et al. |
| 2015/0334241 A1 | 11/2015 | Noldus |
| 2016/0156782 A1 | 6/2016 | Mumick et al. |
| 2016/0337283 A1* | 11/2016 | Sadhvani ............ G06F 3/04847 |
| 2018/0084114 A1 | 3/2018 | Jiang et al. |
| 2021/0344795 A1 | 11/2021 | Kats et al. |

* cited by examiner

RECORDING A MESSAGE USING A SOFTWARE PLATFORM SERVICE

CROSS-REFERENCE TO RELATED APPLICATION(S)

This application is a continuation of U.S. application Ser. No. 17/243,161, filed Apr. 28, 2021, the entire disclosure of which is herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of video voicemail recording systems and techniques therefor.

One aspect of this disclosure is a method. The method includes routing a call to a client device from a calling device, presenting in-call options for selection at the calling device responsive to the call going unanswered, transmitting a request to open a client application at the calling device responsive to a selection of the second in-call option at the calling device, and storing the video message from the calling device responsive to the request for later access using the client device, in which a first in-call option allows an operator of the calling device to record an audio-only voicemail message for an operator of the client device and a second in-call option allows the operator of the calling device to record a video message for the operator of the client device.

Another aspect of this disclosure is a system. The system includes a private branch exchange (PBX) and a server. The PBX is configured to route a call to a number over a telephony service as a first service from a calling device to an interactive voice response (IVR) system of a client device associated with the telephone number responsive to the call going unanswered. The server is configured to transmit a request to open a client application at the calling device responsive to a selection of an in-call option of the IVR system at the calling device and to store a message associated with a second service received from the calling device responsive to the request.

Yet another aspect of this disclosure is an apparatus. The apparatus includes a memory and a processor configured to execute instructions stored in the memory to route a communication over a first communication modality from a calling device to a client device, present options for selection at the calling device responsive to the communication going unanswered, cause a client application to open at the calling device responsive to a selection of one of the options at the calling device, and store a message corresponding to a second communication modality associated with the selected option from the calling device for later access by the client device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
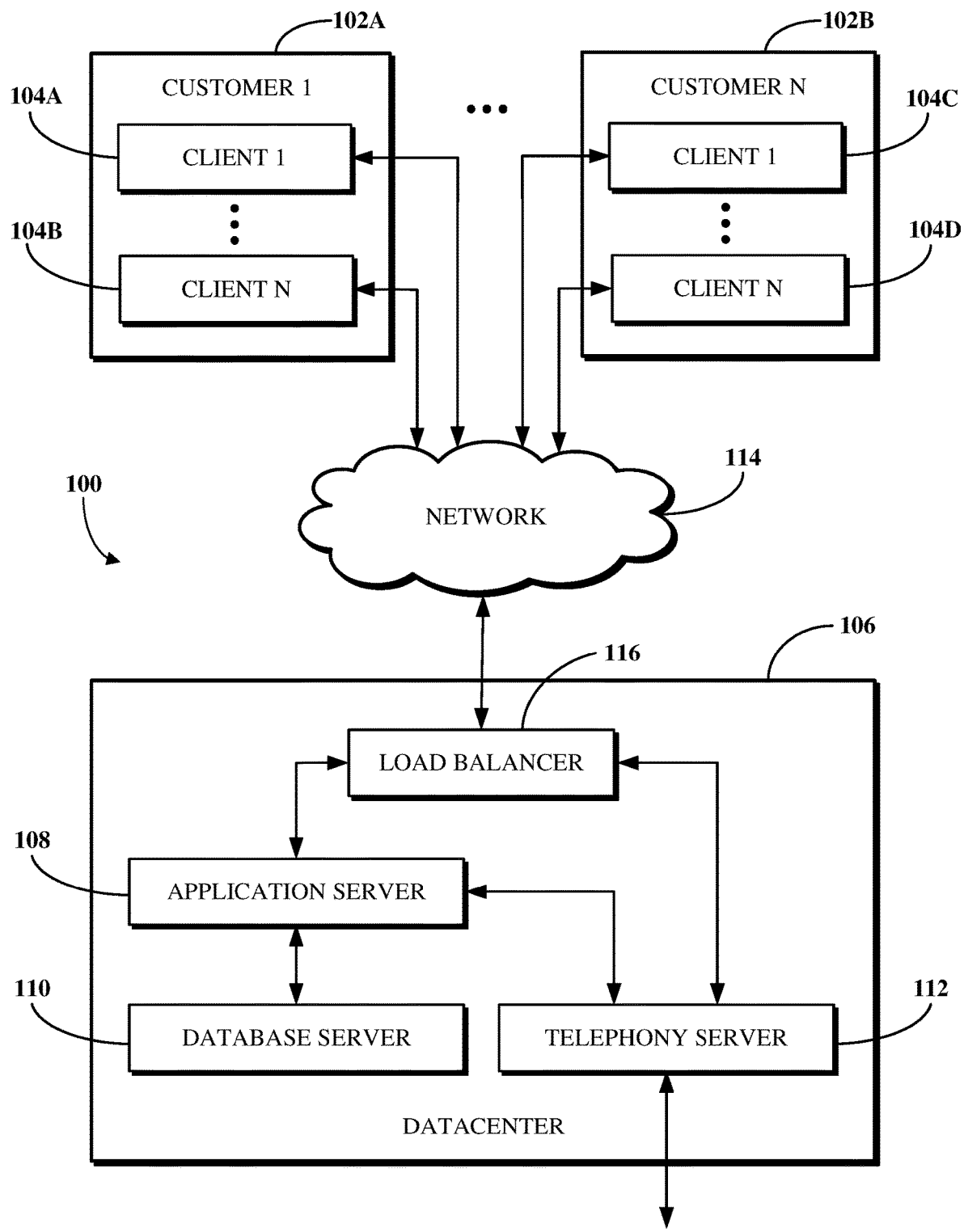
FIG. 1 is a block diagram of an example of an electronic computing and communications system.

Users of a software platform, such as a UCaaS platform, have multiple modalities available to communicate with one another. In particular, users can call each other using a telephony system service of the software platform and attend audio, video, or other conferences over a conferencing system service of the software platform. In many cases, these modalities are connected or integrated such that a current communication initiated over a first modality (e.g., telephony) may be switched to and continued at a second modality (e.g., conferencing). This switch may in at least some cases introduce a previously inaccessible media channel into the communication, such as where a call is elevated to a video-enabled conference.

Typically, whether or not within the context of a software platform, when a caller attempts to reach someone by phone and that person does not answer, the caller is greeted by an audio message which may in some cases be a pre-recorded greeting by that person. The caller then chooses to either leave an audio recording as a voicemail message or to terminate the call without leaving such a message. However, this approach does not accommodate or leverage the multi-modal functionality of a UCaaS platform. For example, limiting a caller to leaving an audio recording in response to an audio recording, all over a telephone call, prevents that caller from leveraging other modalities for leaving a message for the person who did not answer a call.

Implementations of this disclosure address problems such as these using a video voicemail recording system, which, in response to a call going unanswered, enables a caller to leave a conventional audio voicemail message over the same telephony connection as was used for routing the call or to leave a video message using video capture software opened at the calling device. In one example, a call for an operator of a client device is received from a calling device. In-call options for selection at the calling device are presented to the calling device responsive to the call going unanswered, in which a first in-call option allows an operator of the calling device to record an audio-only voicemail message for the operator of the client device and a second in-call option allows the operator of the calling device to record a video message for the operator of the client device. A request to open video capture software at the calling device is then transmitted responsive to a selection of the second in-call option at the calling device, and the video message is received from the calling device responsive to the request.

In one example use case, an operator of a client device, using a video voicemail recording system as disclosed herein, may configure an interactive voice response (IVR) system associated with that client device operator to allow a caller, as an operator of a calling device, to leave messages of different types based on selections of ones of the in-call options, as menu options of the IVR system. For example, the operator of the calling device may be greeted by the IVR system in response to his or her call going unanswered, and he or she may then opt to press '1' to leave a traditional audio recording as a voicemail message or '2' to leave a video recording as a voicemail message. A selection of '2' may thus cause a client application at the calling device to open, such as by the video voicemail recording system transmitting a request for the client application, which includes video capture software, to open at the calling device. The operator of the calling device may then record a video voicemail message within that software, which is then transmitted back to a server for later access by the operator of the client device.

Other example use cases relate to causing a client application running at the calling device to open to enable an operator of the calling device to record or transmit a message over a communication modality which is different from a telephony service. For example, the different communication modality may relate a video capture service, in which case the message may be a video message recorded using a service configured for video capture. In another example, the different communication modality may relate to a messaging service, in which case the message may be a chat message, an instant message, an email message, or another message transmitted using a messaging service. In some cases, more than two options may be presented for selection at a calling device in response to a call going unanswered, such as in which each of the more than two options corresponds to a different communication modality. Thus, although a video voicemail recording system is referenced herein, the video voicemail recording system may facilitate recording or inputting of messages including but not limited to video voicemail messages, for example, chat messages, instant messages, and email messages.

To describe some implementations in greater detail, reference is first made to examples of hardware and software structures used to implement a video voicemail recording system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based PBX system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
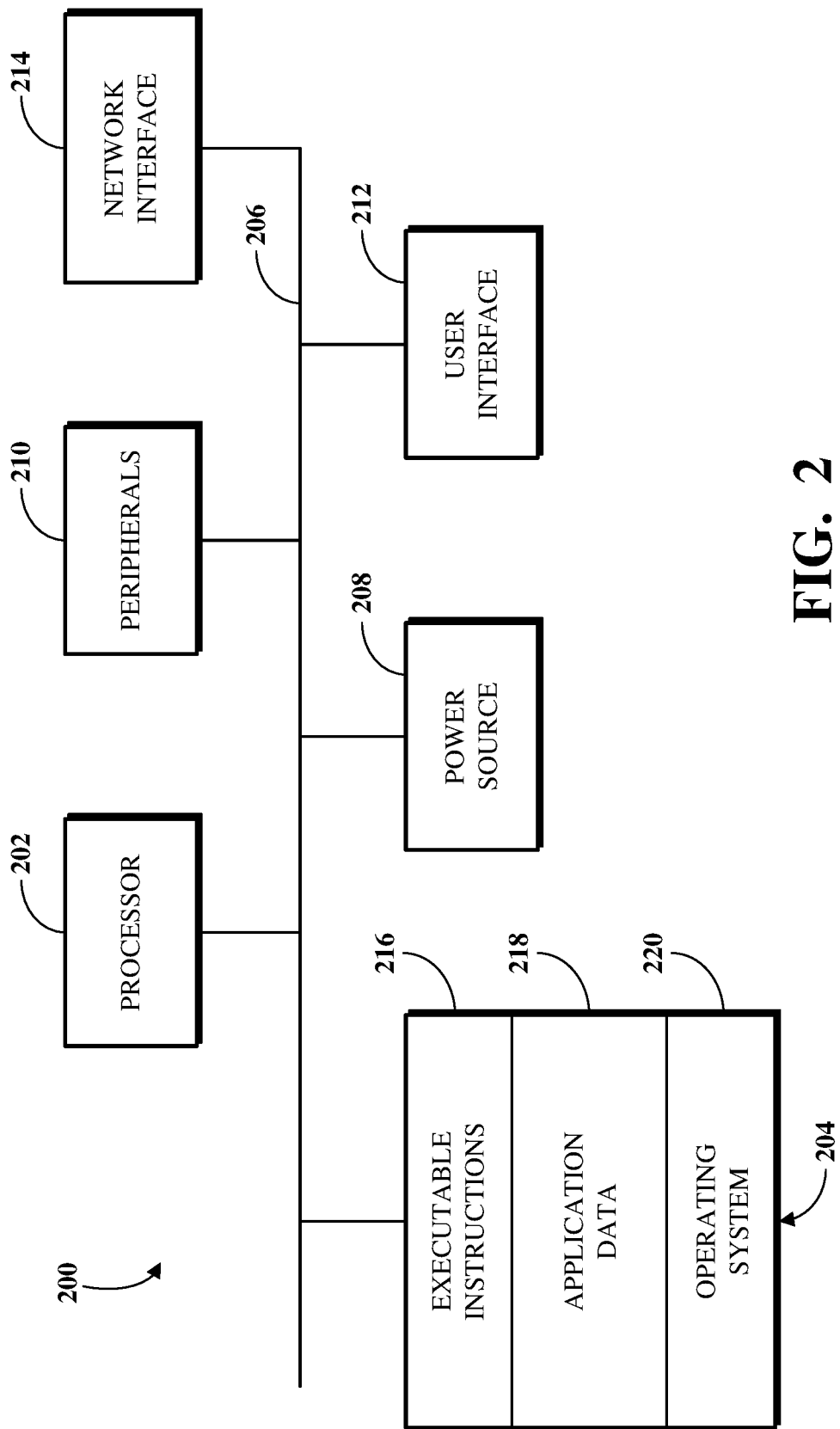
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
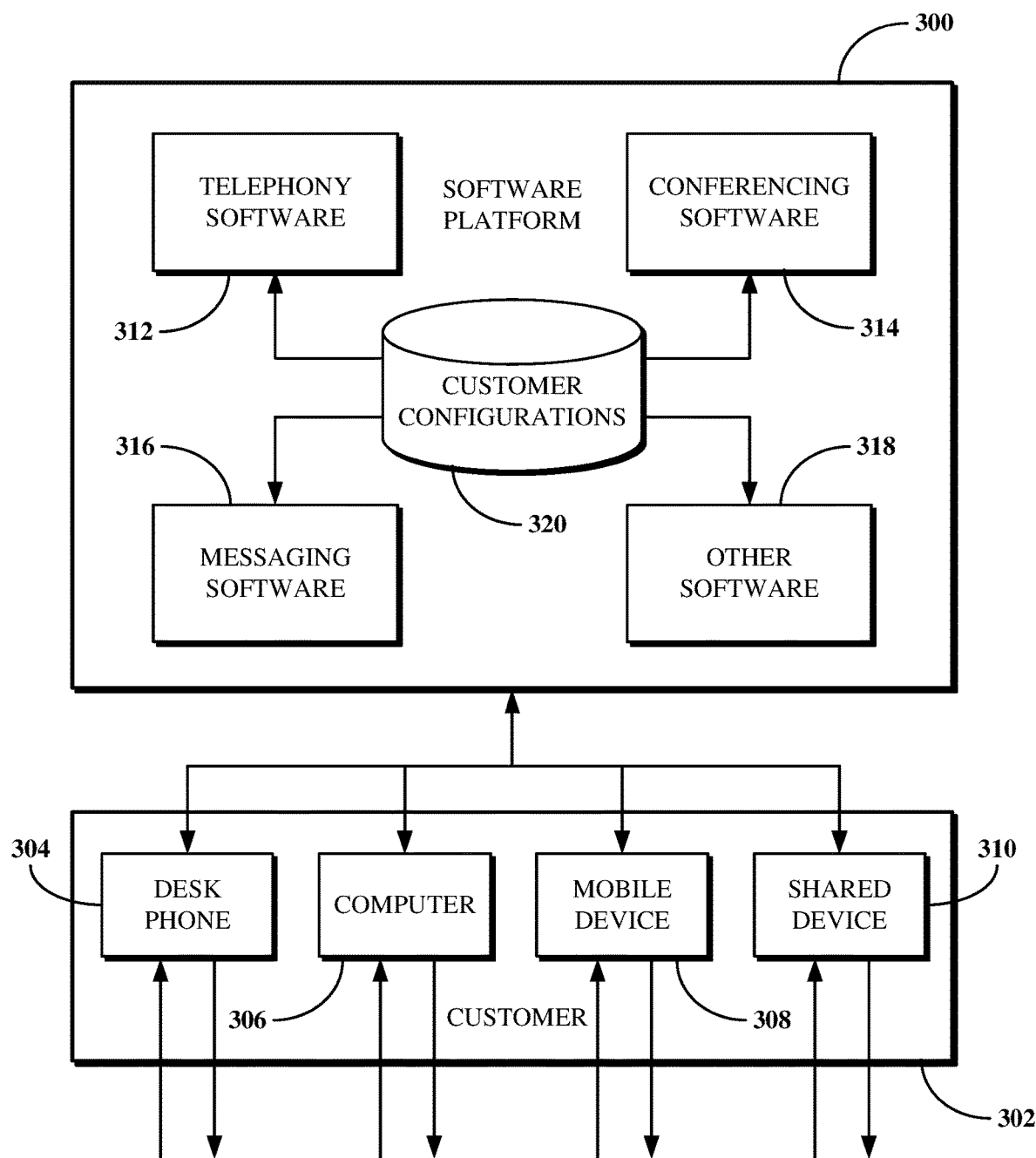
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for video voicemail recording as disclosed herein.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4A:
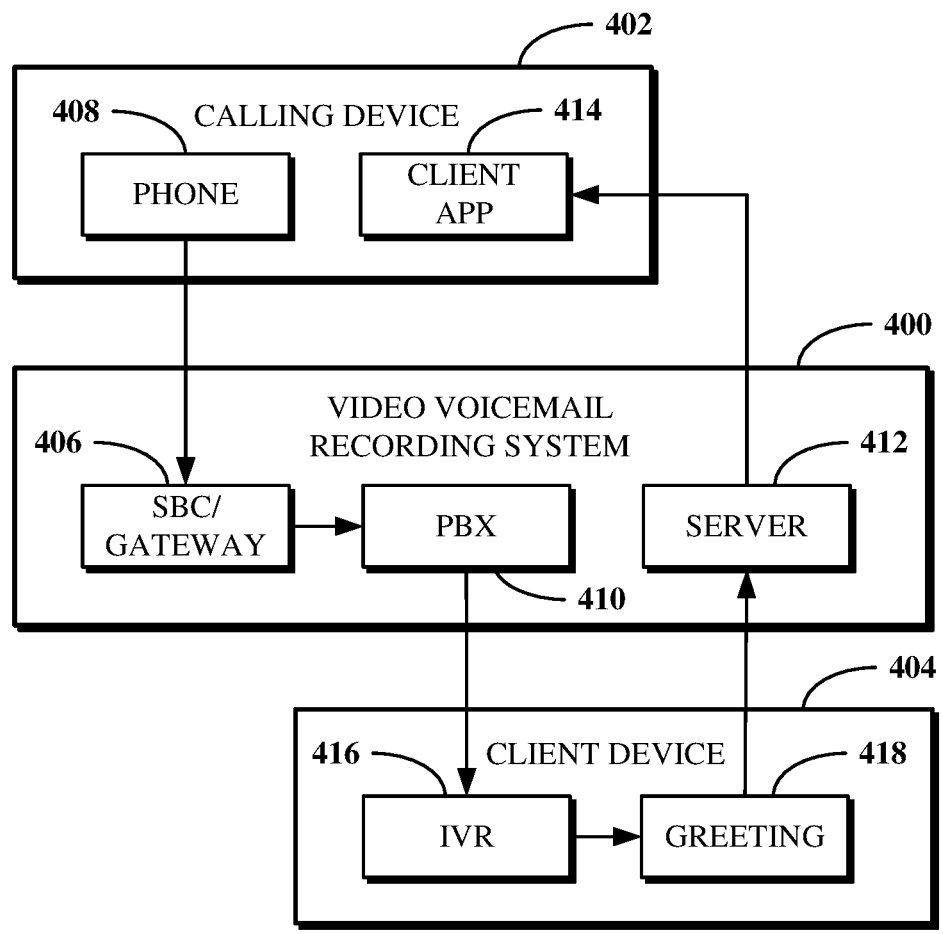
FIG. 4A is a block diagram of an example of a video voicemail system receiving and processing a call over a first communication modality.
Figure 4B:
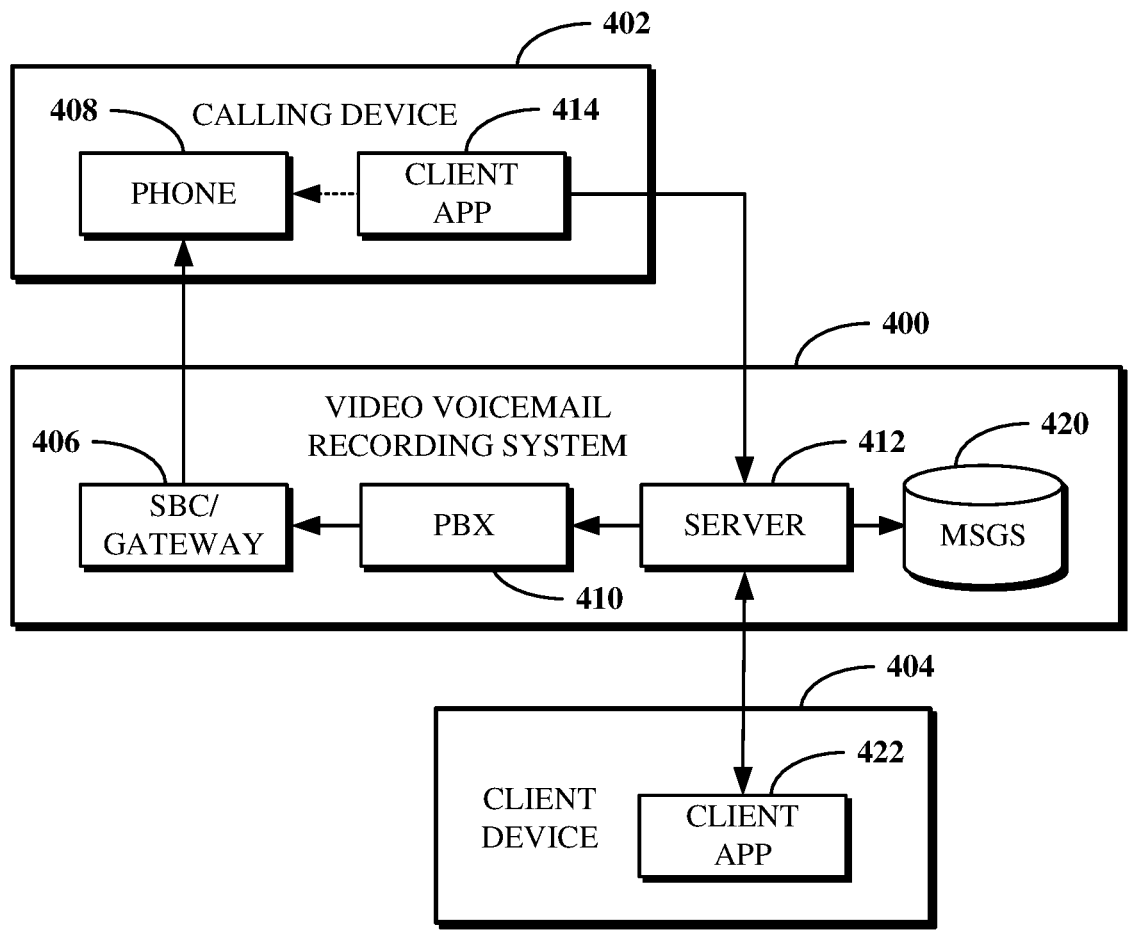
FIG. 4B is a block diagram of an example of a video voicemail system receiving and processing a message over a second communication modality.

FIGS. 4A and 4B are block diagrams of an example of a video voicemail system 400 first receiving a call over a first communication modality and later receiving a message over a second modality. Referring first to FIG. 4A, a block diagram of an example of the video voicemail system 400 receiving and processing a call over a first communication modality is shown. The video voicemail system 400 is intermediary to a calling device 402 from which the call is received and a client device 404 to which the call is routed. The video voicemail system 400 includes a SBC/gateway 406 that receives the call from a phone component 408 of the calling device, a PBX 410 that routes the call to the client device 404, and a server 412 which implements functionality for causing an application 414 running at the calling device 402 to record or transmit a message over a second communication modality. For example, the message may be a video message, a chat message, an instant message, an email message, or the like.

An operator of the calling device 402 initiates the video voicemail recording process by a call to a number associated with an operator of the client device 404 using the phone component 408. The SBC/gateway 406 includes one or more hardware or software components of a telephony system (e.g., the telephony server 112 shown in FIG. 1 and/or the telephony software 312 shown in FIG. 3) that sit at the edge of the telephony network and operate to connect the call to the PBX 410 from the calling device 408 directly or from a PSTN intermediary to the calling device 402 and the telephony network. The PBX 410 includes hardware and/or software components of the telephony system for determining where and how to route the call to the intended destination—in this case, the client device 404—based on routing rules, definitions, or like information associated, for example, with a customer network.

The client device 404 includes an IVR system 416 and a greeting component 418. Responsive to the call going unanswered at the client device 404, the IVR system 416 is used to present one or more in-call options for selection at the calling device 402. The call is considered to go unanswered where an operator of the client device 404 does not accept the call to initiate a real-time communication over the telephony system. The call is considered to go answered where an operator of the client device 404 accepts the call such that a real-time communication over the telephony system occurs between an operator of the calling device 402 and an operator of the client device 404.

The IVR system 416 may output audio and/or video to the calling device 402 to enable selection of one of the in-call options at the calling device 402. For example, the IVR system 416 may be a call destination which receives the call from the calling device 402 on behalf of the client device 404 where the call goes unanswered. In such a case, the in-call options of the IVR system 416 may be presented over the existing telephony connection through which the call is routed to the client deice 404 and thus use audio output. In another example, the call going unanswered may result in the client application 414 or another software aspect at the calling device 402 opening to display video of the IVR system 416.

Each of the in-call options corresponds to a different communication modality implemented using a service associated with a software platform which implements the video voicemail recording system 400, which may, for example, be the software platform 300 shown in FIG. 3. For example, a first in-call option of the IVR system 416 may allow an operator of the calling device 402 to record an audio-only voicemail message over a telephony service implemented using the telephony system, and a second in-call option of the IVR system 416 may allow the operator of the calling device 402 to record a video message over a video capture service implemented by a communication system (e.g., a dedicated video capture system, a conferencing system, or another system) implemented using the server 412. In another example, a first in-call option of the IVR system 416 may allow an operator of the calling device 402 to record an audio-only voicemail message over a telephony service implemented using the telephony system, and a second in-call option of the IVR system 416 may allow the operator of the calling device 402 to transmit a message over a messaging service implemented by a messaging system implemented using the server 412. In some cases, there may be more than two in-call options, such as where one in-call option corresponds to the telephony modality, another in-call option corresponds to the video capture modality, and still another in-call option corresponds to the messaging modality.

Based on the particular in-call option selected at the calling device 402, a greeting is output to the calling device 402 by the greeting component 418. The greeting may be a traditional voicemail greeting that includes a pre-recorded or pre-generated audio message. Alternatively, the greeting may be a video voicemail greeting that includes a pre-recorded or pre-generated video message or video and audio message. As a further alternative, the greeting may be a pre-written or pre-generated text-based greeting. The particular form of the greeting may be based on the communication modality associated with the selected in-call option.

For example, the greeting may be a video voicemail greeting where an in-call option associated with a video capture service is selected. In some implementations, the greeting component 418 may be omitted such that there may be no greeting presented to the calling device 402 after the selection of the in-call option.

The IVR system 416 and the greeting component 418 are shown as being at the client device 404. However, in some implementations, the IVR system 416 and/or the greeting component 418 may instead be located elsewhere. For example, the IVR system 416 and/or the greeting component 418 may be included in the telephony system which includes the SBC/gateway 406 and the PBC 410. In another example, the IVR system 416 and/or the greeting component 418 may be included in the service associated with second communication modality implemented using the server 412. In some implementations, the IVR system 416 and/or the greeting component 418 may be configurable by the operator of the client device 404.

After the selection of the in-call option at the calling device 402, a notification is transmitted to the server 412, for example, from the client device 404. The notification includes information configured to cause the server 412 to generate a request and transmit the request to the calling device 402 to cause the client application 414 to open at the calling device 402. The client application 414 is a software application with access to one or more communication modalities associated with services of a software platform. The request transmitted to the calling device 402 may include instructions that, when processed at the calling device 402, causes a processor of the calling device 402 to run the client application and connect to a service associated with the in-call option selected at the calling device 402.

Referring next to FIG. 4B, a block diagram of an example of the video voicemail system 400 receiving and processing a message over a second communication modality is shown. After the server 412 transmits the request to open the client application 414 at the calling device 402, the operator of the calling device 402 records or otherwise inputs a message in the second communication modality to be transmitted to the server 412 for later access by the operator of the client device 404. For example, recording a message can include using the client application 414 to access a video capture service associated with the software platform to record a video message. In some cases, the message is recorded at the calling device 402 by the generation of a digital file representative of the video message at the calling device 402. In some cases, the message is recorded at the server 412 using information captured at and transmitted from the calling device 402. In another example, inputting a message can include using the client application 414 to access a messaging service associated with the software platform to type a chat message, an instance message, an email message, or another message, which can then be transmitted to the server 412.

The server 412 receives the message or the information used for generating or recording the message, as applicable, from the calling device 402. In cases where the server 412 generates or records the message using information received from the calling device 402, the server 412 then proceeds to generate or record the message based on that information. The server 412 then stores the message in a messages data store 420 of the video voicemail recording system 400. The messages data store 420 is a data store, database, or other repository or storage configured to store one or more messages for later access by an operator of the client device 404. In particular, the operator of the client device 404, through a client application 422 at the client device 404, may later access the message through the server 412 by retrieving the message from the messages data store 420, such as to listen to, play, or otherwise view the message.

After the server 412 stores the message in the messages data store 420, the server 412 transmits a signal configured to end the call to the PBX 410. The PBX 410 forwards the signal to the SBC/gateway 406, which routes the signal to the phone component 408 to cause the phone component 408 to end the call. In some implementations, the client application 414 may cause the call to end at the calling device 402. For example, the client application 414 may be granted permissions to interact with other aspects of the calling device 402 such as the phone component 408. The client application 414 may thus use those permissions to interface with the phone component 408 and cause the phone component 408 to end the call.

Figure 5:
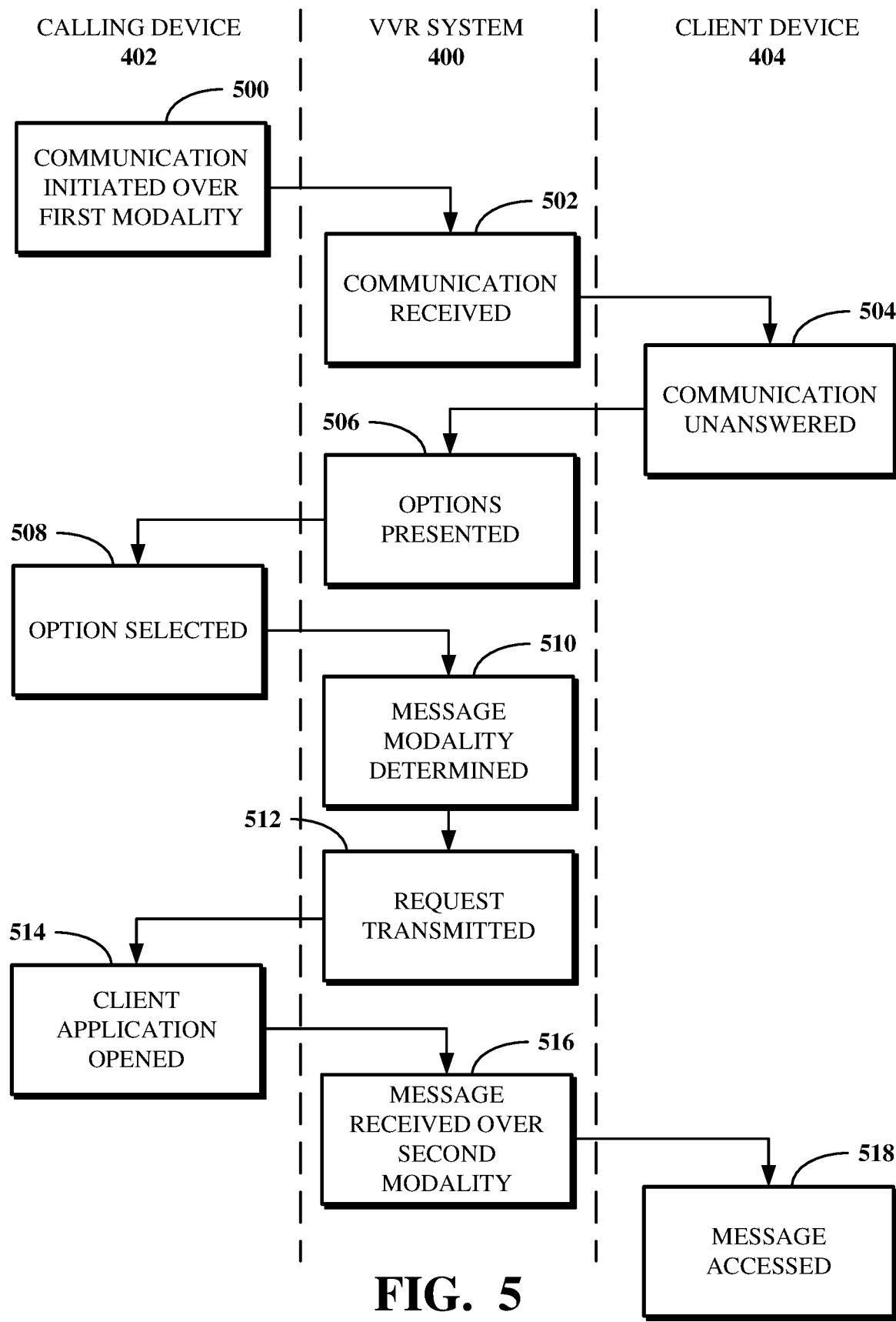
FIG. 5 is an illustration of swim lanes showing an example sequence of operations for video voicemail recording.

FIG. 5 is an illustration of swim lanes showing an example sequence of operations for video voicemail recording. In particular, the sequence of operations are between the calling device 402, the video voicemail recording system 400, and the client device 404 as all are shown in FIG. 4. The sequence of operations begins with at 500 where a communication is initiated at the calling device 402 over a first modality. At 502, the video voicemail recording system 400 receives the communication and then routes it to the client device 404. At 504, the communication is unanswered at the client device 404. At 506, responsive to the video voicemail recording system 400 determining that the communication went unanswered at the client device 404, options are presented to the calling device 402. At 508, one of the options is selected at the calling device 402.

At 510, a modality of a message to be recorded at or otherwise transmitted from the calling device 402 is determined by the video voicemail recording system 400 based on the option selected at the calling device 402. At 512, responsive to the video voicemail recording system 400 determining the message modality, the video voicemail recording system 400 transmits a request configured to cause a client application to open at the calling device 402 to the calling device 402.

At 514, the client application is opened at the calling device 402 responsive to the request from the video voicemail recording system 400, and the operator of the calling device 402 records or transmits a message over the message modality using the client application. At 516, the message is received at the video voicemail recording system 400, which makes the message accessible to an operator of the client device 404. For example, at 518, the message may be accessed using the client device 404.

Figure 6:
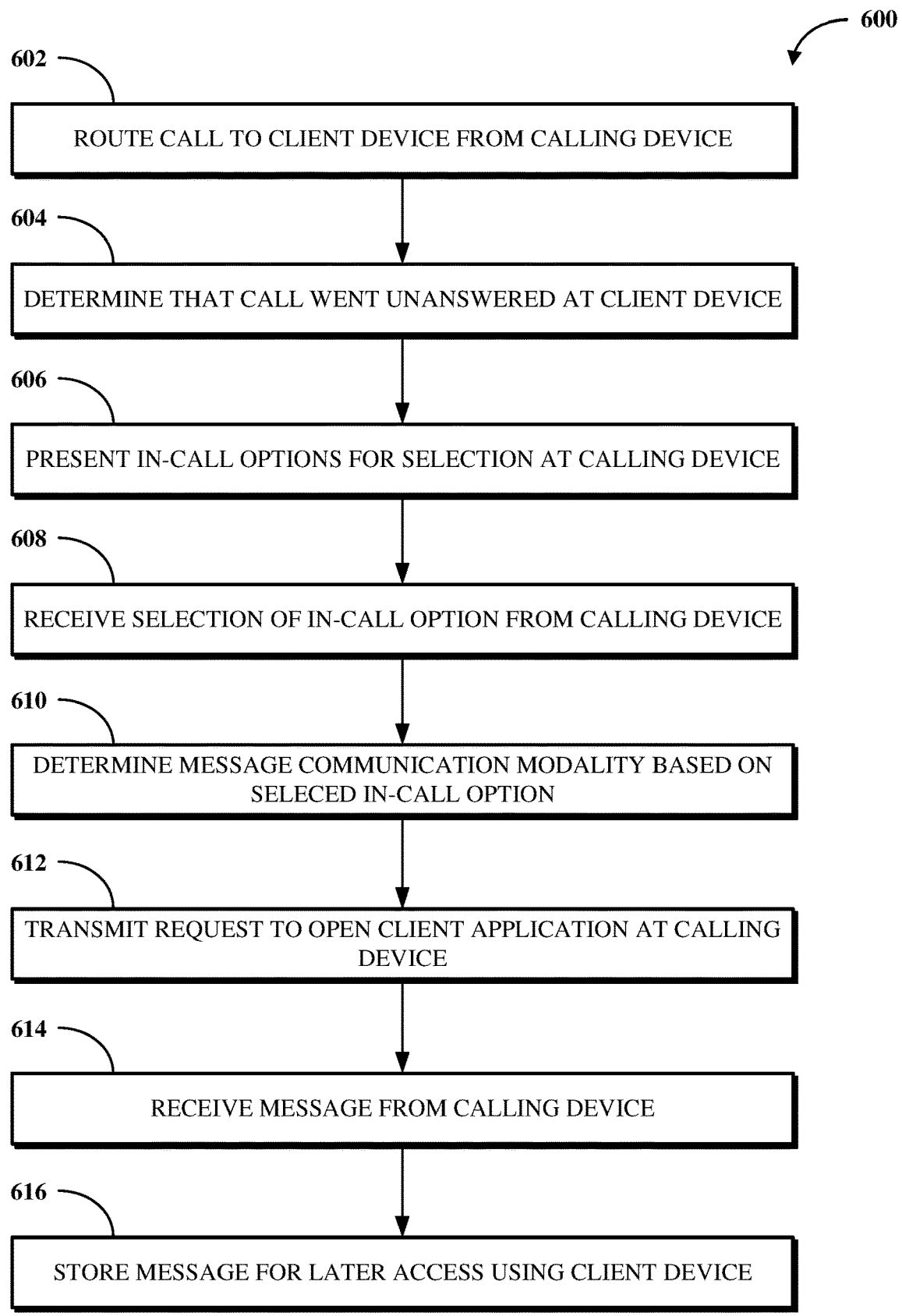
FIG. 6 is a flowchart of an example of a technique for video voicemail recording.

To further describe some implementations in greater detail, reference is next made to examples of techniques which may be performed by or using a video voicemail recording system. FIG. 6 is a flowchart of an example of a technique 600 for video voicemail recording. The technique 600 can be executed using computing devices, such as the systems, hardware, and software described with respect to FIGS. 1-5. The technique 600 can be performed, for example, by executing a machine-readable program or other computer-executable instructions, such as routines, instructions, programs, or other code. The steps, or operations, of the technique 600 or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, a call from a calling device is routed to a client device. The call is a communication over a first communication modality, namely, a telephony service, which may, for example, be associated with a software platform, such as a UCaaS platform.

At 604, a determination is made that the call went unanswered at the client device. The determination that the call went unanswered at the client device may be made based on the client device not being used to accept the call within some amount of time of the call being routed to the client device, or based on other factors.

At 606, in-call options are presented for selection at the calling device. The in-call options are menu options of an IVR system associated with the client device. There may be one or more in-call options, in which each of the in-call options corresponds to a different communication modality. For example, a first option may correspond to a telephony service as a first communication modality, a second option may correspond to a video capture service as a second communication modality, and a third option may correspond to a messaging service as a third communication modality.

At 608, a selection of one of the in-call options is received from the calling device. Receiving the selection of the in-call option includes receiving a notification indicating the in-call option selected and/or the communication modality associated with that in-call option.

At 610, a message communication modality is determined based on the selected in-call option. For example, the message communication modality may be determined by processing the selection of the in-call option to identify the message communication modality.

At 612, a request to open a client application at the calling device is transmitted to the calling device. The request includes some information configured to cause the client application to run at the calling device to enable an operator of the calling device to use a service associated with the message communication modality to record or otherwise input the message or information representative thereof.

At 614, a message is received from the calling device. Receiving the message can include receiving the message from the calling device in which the message was recorded or generated at the calling device. Alternatively, receiving the message can include receiving information representative of the message and using that information to record or generate the message, such as at a server associated with the message communication modality service.

At 616, the message is stored for later access using the client device. For example, the message may be stored in a data store accessible using a client application running at the client device, such as through a server associated with the software platform.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
 obtaining, from a calling device during a call with a client device facilitated using a telephony service of a unified communications as a service (UCaaS) software platform, a request to record a message for a user of the client device;

presenting in-call options for selection at the calling device responsive to the call going unanswered, wherein a first in-call option allows the calling device to record an audio-only voicemail message for the client device and a second in-call option allows the calling device to record a video message for the client device;

causing, based on the request, a client application associated with the UCaaS software platform to record the message using a non-telephony service of the UCaaS software platform; and causing, based on the recorded message, the call to end.

2. The method of claim 1, comprising:

storing, based on the recorded message, the recording of the message for later access.

3. The method of claim 1, wherein the non-telephony service corresponds to a video modality and the message is a video message.

4. The method of claim 1, wherein the non-telephony service corresponds to a chat modality and the message is a chat message.

5. The method of claim 1, wherein the non-telephony service corresponds to an instant message modality and the message is an instant message.

6. The method of claim 1, wherein the non-telephony service corresponds to an email modality and the message is an email message.

7. A non-transitory computer readable medium storing instructions operable to cause one or more processors to perform operations comprising:

obtaining, from a calling device during a call with a client device facilitated using a telephony service of a unified communications as a service (UCaaS) software platform, a request to record a message for a user of the client device;

presenting in-call options for selection at the calling device responsive to the call going unanswered, wherein a first in-call option allows the calling device to record an audio-only voicemail message for the client device and a second in-call option allows the calling device to record a video message for the client device;

causing, based on the request, a client application associated with the UCaaS software platform to record the message using a non-telephony service of the UCaaS software platform; and causing, based on the recorded message, the call to end.

8. The non-transitory computer readable medium of claim 7, wherein the request is received based on the call going unanswered at the client device.

9. The non-transitory computer readable medium of claim 7, wherein the request is based on a selection of a menu option of an interactive voice response system.

10. The non-transitory computer readable medium of claim 7, the operations comprising:

routing the call from the calling device to the client device; and determining that the call is not accepted at the client device.

11. The non-transitory computer readable medium of claim 7, wherein a greeting associated with a same modality as the message is presented based on the request.

12. An apparatus, comprising:

a memory; and a processor configured to execute instructions stored in the memory to:

obtain, from a calling device during a call with a client device facilitated using a telephony service of a unified communications as a service (UCaaS) software platform, a request to record a message for a user of the client device;

present in-call options for selection at the calling device responsive to the call going unanswered, wherein a first in-call option allows the calling device to record an audio-only voicemail message for the client device and a second in-call option allows the calling device to record a video message for the client device;

cause, based on the request, a client application associated with the UCaaS software platform to record the message using a non-telephony service of the UCaaS software platform; and cause, based on the recorded message, the call to end.

13. The apparatus of claim 12, wherein the processor is configured to execute the instructions to:

present, based on the request, a video voicemail greeting associated with the user of the client device.

14. The apparatus of claim 12, wherein, to cause the client application to open at the calling device, the processor is configured to execute the instructions to:

transmit, to the calling device based on the request, a second request configured to connect the client application to the non-telephony service.

15. The apparatus of claim 12, wherein the message is recorded at the calling device.

16. The apparatus of claim 12, wherein the message is recorded other than at the calling device.

17. The apparatus of claim 12, wherein the message includes video content.

* * * * *